US008121871B2

(12) United States Patent
Young, III et al.

(10) Patent No.: US 8,121,871 B2
(45) Date of Patent: Feb. 21, 2012

(54) SYSTEM, METHOD AND SOFTWARE APPLICATION FOR ACCESSING AND PROCESSING INFORMATION

(75) Inventors: Freeland Glen Young, III, Glen Allen, VA (US); Liane Dietrich, Richmond, VA (US); Diana H. Garland, Sandy Hook, VA (US); Lee Edwards, Ashland, VA (US)

(73) Assignee: Genworth Financial, Inc., Richmond, VA (US)

( * ) Notice: Subject to any disclaimer, the term of this patent is extended or adjusted under 35 U.S.C. 154(b) by 2796 days.

(21) Appl. No.: 09/769,526

(22) Filed: Jan. 26, 2001

(65) Prior Publication Data
US 2002/0103729 A1    Aug. 1, 2002

(51) Int. Cl.
G06Q 40/00    (2006.01)
(52) U.S. Cl. .................. 705/4; 705/1.1; 705/14.46
(58) Field of Classification Search .............. 705/4, 26, 705/27, 1; 707/3
See application file for complete search history.

(56) References Cited

U.S. PATENT DOCUMENTS

| 4,831,526 A | 5/1989 | Luchs |
| 4,837,693 A | 6/1989 | Schotz |
| 4,969,094 A | 11/1990 | Halley |
| 5,191,522 A | 3/1993 | Bosco |
| 5,195,170 A | 3/1993 | Eberhardt |
| 5,235,507 A | 8/1993 | Sackler |
| 5,293,488 A | 3/1994 | Riley et al. |
| 5,446,653 A | 8/1995 | Miller |
| 5,479,344 A | 12/1995 | Keziah |
| 5,523,942 A | 6/1996 | Tyler |
| 5,537,315 A | 7/1996 | Mitcham |
| 5,557,515 A | 9/1996 | Abbruzzese et al. |
| 5,590,037 A | 12/1996 | Ryan |
| 5,615,121 A | 3/1997 | Babayev et al. |
| 5,655,085 A | 8/1997 | Ryan |
| 5,668,878 A | 9/1997 | Brands |
| 5,737,728 A | 4/1998 | Sisley et al. |
| 5,752,236 A | 5/1998 | Sexton |
| 5,754,939 A | 5/1998 | Herz et al. |
| 5,781,633 A | 7/1998 | Tribble et al. |
| 5,809,478 A | 9/1998 | Greco et al. |

(Continued)

FOREIGN PATENT DOCUMENTS
WO    WO 0191017    11/2001

OTHER PUBLICATIONS
U.S. Appl. No. 60/243,778.*

(Continued)

*Primary Examiner* — Alexander Kalinowski
*Assistant Examiner* — Abhishek Vyas
(74) *Attorney, Agent, or Firm* — Hunton & Williams (57) ABSTRACT

The present invention relates generally to systems, methods and software applications for storing, retrieving, and displaying information. More particularly, the present invention relates to providing a comprehensive, interactive tool for storing, retrieving, and displaying agent identifying information and agent commission information. The method of the present invention comprises the steps of: receiving agent identifying information and agent commission information; analyzing and sorting the received agent identifying information and agent commission information; saving the agent identifying information and the agent commission information; providing an interactive display of the agent identifying information and the agent commission information; providing interactive access to a display of detailed agent identifying information; and providing interactive access to a display of detailed agent commission information.

21 Claims, 5 Drawing Sheets

U.S. PATENT DOCUMENTS

| | | | |
|---|---|---|---|
| 5,835,087 A | 11/1998 | Herz et al. |
| 5,845,256 A | 12/1998 | Pescitelli |
| 5,845,281 A | 12/1998 | Benson |
| 5,873,066 A | 2/1999 | Underwood |
| 5,903,873 A | 5/1999 | Peterson |
| 5,907,828 A | 5/1999 | Meyer |
| 5,943,652 A | 8/1999 | Sisley et al. |
| 5,956,691 A | 9/1999 | Powers |
| 5,963,911 A | 10/1999 | Walker et al. |
| 6,016,344 A | 1/2000 | Katz |
| 6,018,714 A | 1/2000 | Risen |
| 6,026,364 A | 2/2000 | Whitworth |
| 6,041,123 A | 3/2000 | Colvin |
| 6,076,072 A | 6/2000 | Libman |
| 6,078,890 A | 6/2000 | Mangin |
| 6,085,176 A | 7/2000 | Woolston |
| 6,092,047 A | 7/2000 | Hyman |
| 6,128,598 A | 10/2000 | Walker |
| 6,134,530 A | 10/2000 | Bunting et al. |
| 6,272,528 B1 | 8/2001 | Cullen |
| 6,285,998 B1 | 9/2001 | Black |
| 6,298,377 B1 | 10/2001 | Hartikainen |
| 6,324,568 B1 | 11/2001 | Diec |
| 6,334,111 B1 | 12/2001 | Carrott |
| 6,356,880 B1 | 3/2002 | Goossens et al. |
| 6,405,175 B1 | 6/2002 | Ng |
| 6,411,939 B1 | 6/2002 | Parsons |
| 6,456,979 B1 | 9/2002 | Flagg |
| 6,510,432 B1 | 1/2003 | Doyle |
| 6,523,027 B1 | 2/2003 | Underwood |
| 6,609,106 B1 | 8/2003 | Robertson |
| 6,615,180 B1 | 9/2003 | Anderton |
| 6,633,899 B1 | 10/2003 | Coward |
| 6,643,661 B2 | 11/2003 | Polizzi |
| 6,647,374 B2 | 11/2003 | Kansal |
| 6,662,164 B1 | 12/2003 | Koppelman et al. |
| 6,684,189 B1 | 1/2004 | Ryan |
| 6,701,362 B1 | 3/2004 | Subramonian et al. |
| 6,714,914 B1 | 3/2004 | Peters |
| 6,735,569 B1 | 5/2004 | Wizig |
| 6,792,410 B1 | 9/2004 | Donovan |
| 6,862,580 B1 | 3/2005 | Ford |
| 6,917,968 B2 | 7/2005 | Nakamura |
| 6,981,214 B1 | 12/2005 | Miller et al. |
| 7,117,170 B1 | 10/2006 | Bennett |
| 7,143,051 B1* | 11/2006 | Hanby et al. ..................... 705/4 |
| 7,240,015 B1 | 7/2007 | Karmouch |
| 7,490,050 B2 | 2/2009 | Grover et al. |
| 2001/0023404 A1 | 9/2001 | Ogawa et al. |
| 2001/0032094 A1 | 10/2001 | Ghosh |
| 2001/0032181 A1 | 10/2001 | Jakstadt et al. |
| 2001/0034622 A1 | 10/2001 | Davis |
| 2001/0037265 A1 | 11/2001 | Kleinberg |
| 2001/0047282 A1 | 11/2001 | Raveis |
| 2001/0049611 A1 | 12/2001 | Peach |
| 2002/0002475 A1 | 1/2002 | Freedman et al. |
| 2002/0022976 A1 | 2/2002 | Hartigan |
| 2002/0026334 A1* | 2/2002 | Igoe ............................... 705/4 |
| 2002/0029158 A1 | 3/2002 | Wolff |
| 2002/0046064 A1 | 4/2002 | Maury |
| 2002/0052765 A1 | 5/2002 | Taylor |
| 2002/0055860 A1 | 5/2002 | Wahlbin |
| 2002/0055862 A1* | 5/2002 | Jinks ............................... 705/4 |
| 2002/0059084 A1 | 5/2002 | Wahlbin |
| 2002/0059085 A1 | 5/2002 | Wahlbin |
| 2002/0059086 A1 | 5/2002 | Wahlbin |
| 2002/0059087 A1 | 5/2002 | Wahlbin |
| 2002/0062232 A1 | 5/2002 | Wahlbin |
| 2002/0062233 A1 | 5/2002 | Wahlbin |
| 2002/0062234 A1 | 5/2002 | Wahlbin |
| 2002/0062235 A1 | 5/2002 | Wahlbin |
| 2002/0069091 A1 | 6/2002 | Wahlbin |
| 2002/0069092 A1 | 6/2002 | Wahlbin |
| 2002/0082871 A1* | 6/2002 | Younger et al. ............... 705/4 |
| 2002/0082873 A1 | 6/2002 | Wahlbin |
| 2002/0087363 A1 | 7/2002 | Wahlbin |
| 2002/0087364 A1* | 7/2002 | Lerner et al. ................. 705/4 |
| 2002/0091550 A1 | 7/2002 | White |
| 2002/0103729 A1 | 8/2002 | Young |
| 2002/0111835 A1 | 8/2002 | Hele |
| 2002/0116228 A1 | 8/2002 | Bauer |
| 2002/0116229 A1 | 8/2002 | Steuart |
| 2002/0116231 A1 | 8/2002 | Hele |
| 2002/0120474 A1 | 8/2002 | Hele |
| 2002/0120476 A1 | 8/2002 | Labelle |
| 2002/0120477 A1 | 8/2002 | Jinnett |
| 2002/0128881 A1 | 9/2002 | Wahlbin |
| 2002/0133383 A1 | 9/2002 | Chao |
| 2002/0138308 A1 | 9/2002 | Harada |
| 2002/0138310 A1 | 9/2002 | Sagalow |
| 2002/0147618 A1 | 10/2002 | Mezrah |
| 2002/0156780 A1 | 10/2002 | Hertz |
| 2002/0169678 A1 | 11/2002 | Chao |
| 2002/0188484 A1 | 12/2002 | Grover |
| 2002/0194033 A1 | 12/2002 | Huff |
| 2003/0005299 A1 | 1/2003 | Xia et al. |
| 2003/0088443 A1 | 5/2003 | Majikes et al. |
| 2003/0093302 A1 | 5/2003 | Quido et al. |
| 2003/0093304 A1 | 5/2003 | Keller |
| 2003/0182290 A1 | 9/2003 | Parker |
| 2003/0187768 A1 | 10/2003 | Ryan |
| 2003/0200122 A1 | 10/2003 | Nauert |
| 2003/0204421 A1 | 10/2003 | Houle et al. |
| 2003/0208384 A1 | 11/2003 | Nelson |
| 2004/0030587 A1 | 2/2004 | Danico |
| 2004/0030589 A1 | 2/2004 | Leisher |
| 2004/0059639 A1 | 3/2004 | Ripper |
| 2004/0083125 A1 | 4/2004 | Almeida |
| 2004/0103006 A1 | 5/2004 | Wahlbin |
| 2004/0103007 A1 | 5/2004 | Wahlbin |
| 2004/0103008 A1 | 5/2004 | Wahlbin |
| 2004/0103010 A1 | 5/2004 | Wahlbin |
| 2004/0128147 A1 | 7/2004 | Vallinayagam |
| 2004/0128170 A1 | 7/2004 | MacKethan |
| 2004/0128171 A1 | 7/2004 | Rees |
| 2004/0128172 A1 | 7/2004 | Van Cleave |
| 2004/0153347 A1 | 8/2004 | Kunze |
| 2004/0205456 A1 | 10/2004 | Hammock |
| 2004/0225535 A1 | 11/2004 | Bond |
| 2004/0267651 A1 | 12/2004 | Jenson et al. |
| 2005/0055248 A1 | 3/2005 | Helitzer |
| 2005/0055249 A1 | 3/2005 | Helitzer et al. |
| 2005/0060182 A1 | 3/2005 | Nagelvoort |
| 2005/0060208 A1 | 3/2005 | Gianantoni |
| 2005/0114184 A1 | 5/2005 | Rock |
| 2005/0125260 A1 | 6/2005 | Green |
| 2005/0144046 A1 | 6/2005 | Schloss |
| 2005/0144047 A1 | 6/2005 | Tran |
| 2005/0187802 A1 | 8/2005 | Koeppel |
| 2005/0193063 A1 | 9/2005 | Cannata et al. |
| 2005/0209893 A1 | 9/2005 | Nahra |
| 2006/0020530 A1 | 1/2006 | Hsu |
| 2006/0064330 A1 | 3/2006 | Sumino |
| 2006/0206362 A1 | 9/2006 | Rudy |
| 2007/0156460 A1 | 7/2007 | Nair |
| 2007/0174096 A1 | 7/2007 | Cain |
| 2007/0192145 A1 | 8/2007 | Hellickson |

OTHER PUBLICATIONS

Anonymous, "Conseco Expands Web Site, Latest Step in Ongoing Initiative to Become; "Resource center" for Middle-America Customers and Representatives", Business Wire, Jul. 15, 1999, No. 43177075, 3 pages.*

Holyoke, Larry, "Missouri hot online market for Genelco, other insurers", Mar. 13, 2000, Vol. 20, No. 27, pp. 37.*

Staples, Edward, "VA fees discounted via front loading", Advisor Today, Feb. 2000, vol. 95, No. 2, pp. 128.*

Anonymous, information available from the web site of Climark, Apr. 1999, 4 pages.*

Anonymous, No. 42230884, "Penn Treaty American Corporation Launches Online Resource Center", PR Newswire, Jun. 8, 1999, 2 pages.*

Information available from the web site of Client Marketing Systems, "Advisors Assistant", Sep. 16, 2000, 6 pages.*

John W Macdonald. (Jan. 2001). P-C agents can control worksite plans. National Underwriter, 106(3), 12-14. Retrieved Sep. 28, 2011, from ABI/INFORM Global. (Document ID: 103406003).*

Vesta Insurance Group, Inc. Reports Third Quarter and Nine Month 2000 Results. (Oct. 31). PR Newswire,1. Retrieved Sep. 28, 2011, from Business Dateline. (Document ID: 63053708).*

International Search Report dated Mar. 3, 2003 for Application No. PCT/US02/02208, filed Jan. 28, 2002.

Start-up targets sales commissions with TallyUp suite, InfoWorld Daily News, Jun. 22, 1998, pp. 1-2.

"Sensormatic Selects Triology's SC Commission for Dynamic Sales Compensation Management," Business Wire, Jun. 8, 1999, pp. 1-2.

Akibia, CRM: Case Studies, Consulting: Clients, <http:/www.polaris1.com/ecrm/casestudies/citibank/default.asp>, printed Mar. 26, 2002, 2 pages.

SIEBELFANS.COM, What is Siebel?, <http:/www.siebelfans.com/More_on_siebel.htm>, printed Mar. 26, 2002, 3 pages.

SIEBEL.COM, "Implementing Best practice" http://www.siebelcom/call-center/workflow-automation.shtm, printed Feb. 24, 2005, 2 pages.

www.priceline.com Feb. 29, 2000.

Patrizio, Legacy Data: One Solution for Two Big Problems, Informationweek.com, Jun. 2000, pp. 124, 126, 128.

PCT-International Search Report dated Oct. 2, 2002 for Application No. PCT/US02/04958, filed Feb. 21, 2002.

"Sam's Teach Yourself Active Server™ Pages in 24 Hours", Jun. 1999, Sams Publishing (11 pages).

Nguyen, Accessing relational databases from the World Wide Web, Jun. 1996, ACM SIGMOD, vol. 25, Issue 2, pp. 529-540 (12 pages).

Iyengar, Dynamic argument embedding: preserving state on the World Wide Web, Mar. 1997, Internet Computer, IEEE, vol. 1, Issue 2, p. 50-56 (7 pages).

McCandless, Web advertising, May 1998, Intelligent Systems and Their Applications, IEEE, vol. 13, Issue 3, p. 8-9 (2 pages).

Delbaere, IAA 2001 White Paper Insurance Application Architecture (IAA), Mar. 27, 2001, IBM. (16 pages).

* cited by examiner

PAID AND PENDING COMMISSIONS REPORT

LEGAL | CONTACT US

ORIGINAL SORT ORDER
VIEW A PRINTABLE VERSION

| AGENT/REP NAME | POLICY ACCOUNT | CLIENT NAME | PRODUCT | EST. GROSS COMMISSION | EST. PROC. DATE |
|---|---|---|---|---|---|
| JONES, TOM | 0000000023 | GRANELL | TERM | $1.43 | SEP-22 |
| JONES, TOM | 0000000012 | BARBER | TERM | $1.75 | SEP-22 |
| JONES, TOM | 0000000012 | BARBER | TERM | $1.75 | SEP-22 |
| JONES, TOM | 0000000020 | BARBER | TERM | $10.08 | SEP-22 |
| SMITH, MARY | 0000000020 | BARBER | TERM | $10.08 | SEP-22 |
| SMITH, MARY | 0000000020 | BARBER | TERM | $10.08 | SEP-22 |
| SMITH, MARY | 0000000019 | BARBER | TERM | $7.72 | SEP-22 |
| SMITH, MARY | 0000000019 | BARBER | TERM | $7.72 | SEP-22 |
| SMITH, MARY | 0000000019 | BARBER | TERM | $7.72 | SEP-22 |
| CARTER, BILL | 0000000089 | CARNEY | TERM | $0.87 | SEP-22 |
| CARTER, BILL | 0000000089 | CARNEY | TERM | $0.87 | SEP-22 |
| CARTER, BILL | 0000000089 | CARNEY | TERM | $0.87 | SEP-22 |
| CARTER, BILL | 0000000011 | JACKSON | TERM | $3.89 | SEP-22 |

FIG. 5

PAID AND PENDING COMMISSIONS REPORT DETAIL

LEGAL | CONTACT US

DOE, JOHN

| | | |
|---|---|---|
| 74a | POLICY NUMBER: | 192700553 |
| 74b | CLIENT NAME: | BURNS JOHN J |
| 74c | PRODUCT: | CVUL |
| 74d | COMPANY: | GELAAC |
| 74e | ISSUE DATE: | MAY 06, 1999 |
| 75a | EST. COMM. PROC. DATE: | SEP 08, 2000 |
| 75b | FACE AMOUNT: | $500,000.00 |
| 75c | PREMIUM: | $112.83 |
| 75d | PREMIUM MODE: | MONTHLY |
| 75e | ISSUE AGE: | 35 |
| 75f | SPLIT%: | 100.0% |
| 75g | COMMISSIONABLE AMOUNT: | $112.83 |
| 75h | COMMISSIONABLE RATE: | 2.0% |
| 75i | EST. GROSS COMMISSION: | $2.26 |
| 75j | REFERENCE NUMBER: | 37193522 |

SYSTEM, METHOD AND SOFTWARE APPLICATION FOR ACCESSING AND PROCESSING INFORMATION

BACKGROUND OF THE INVENTION

The present invention relates generally to a system, method and software application for storing, retrieving, and displaying information. More particularly, the present invention relates to a system, method and software application which allows for the interactive storage, retrieval, and display of agent identifying information and agent commission information. The present invention allows users to more easily and conveniently access and verify agent identifying information and agent commission information.

Insurance companies generally offer a wide variety of insurance and financial plans suited for various types of individuals and circumstances. To offer and manage these plans, insurance companies generally rely on great numbers of agents and insurance agents (hereafter collectively referred to as "agents") to sell and issue insurance policies to individual policy holders on their behalf. Each insurance company authorizes its agents to write policies on its behalf by way of an appointment.

Generally, an appointment is a legal authorization which allows an agent to act on behalf of an appointing insurance company and to enter into specific agreements with policy holders on its behalf. Generally, each agent is appointed for a given time, within a given state, with the authority to sell a particular set of products. Commonly, a single appointed agent can be responsible for creating millions of dollars in financial obligations for an appointing insurance company.

To assist in tracking each of their agents, appointing companies generally use a variety of agent identifying information. This agent identifying information generally includes assigned writing codes or other identifying numbers such as birth dates, social security numbers and the like. Additionally, agent identifying information may include other information such as an agent's name, address, telephone number and the like.

Insurance agents are generally paid commissions based upon the various terms and conditions of the policies they write and the commission schedules in their sales contracts. Among the pieces of information which may effect the payment and the amount of a commission are: the estimated commission processing date, which determines when a commission becomes payable; the face amount of policy written; the premium paid for the policy; the category or mode of the premium; the issue age of the policy; and the split percentage of the commission, if any. Each of these factors are generally combined by insurance companies to establish a gross commissionable amount which is multiplied by a specific commission rate agreed upon by the agent and the insurance company. By multiplying the gross commissionable amount by the commission rate, insurance companies and their agents generally determine a gross commission which is payable to the soliciting agent. Collectively, each piece of information used to derive an agent's commission may be included in the term agent commission information.

Presently, insurance companies track agent commission information and agent identifying information by maintaining and updating a set of paper files with the support of a computerized database system. Generally, direct access to information on this system is limited to administrators directly responsible for updating and maintaining these records. When updates are required, generally the responsible administrators make all of the necessary changes manually and then generate a letter or a phone call to the affected agent confirming the change. When the agent wishes to make a change or obtain information, the agent is responsible for calling or writing the insurance company to effect the change and the company, through its administrators, then updates its files accordingly.

As may be apparent, the present system for tracking agent identifying information and agent commission information has several drawbacks which makes it inadequate to manage large numbers of agents. First, the present system requires large numbers of people to oversee and manage the files and information for each agent. This makes the present system very expensive and burdensome on appointing companies. Secondly, even when the present system is properly staffed and maintained, the system still requires frequent contact between the appointing company and its agents. Thirdly, even with frequent contact, the present system is highly paper intensive and requires both the agent and their appointing companies to independently maintain and track agent identifying information and agent commission information. This results in the present system being very prone to human error and communication breakdowns.

Accordingly, there is a strong need in the insurance industry for a system which reduces the time and effort required to manage agent identifying information and agent commission information. Additionally, there is a strong need for a system which allows individual agents to easily access their agent identifying information and agent commission information.

BRIEF SUMMARY OF THE INVENTION

The present invention overcomes the problems noted above and provides additional advantages, by providing a system, method and software application which enables users to interactively store, retrieve, and display agent identifying information and agent commission information.

According to the present invention, agent identifying information and agent commission information are able to be accessed and displayed so that remote users can manage and track agents and their commission generating activities. Additionally, both agents and their appointing companies may access and display the status of agents and their commission generating activities in near real time.

Additionally, the present invention also provides various other options to users such as: access to selected forms and various printing and reporting options. By providing the above described features in a comprehensive, user friendly manner, the present invention optimizes the efficiency of the entire agent and commission tracking processes.

Additional advantages of the present invention will be set forth in part in the description which follows, and in part will be obvious from the description, or may be learned by practice of the invention. The advantages of the invention may be realized and attained by means of instrumentalities and combinations, particularly pointed out in the appended claims.

To achieve the advantages and in accordance with the purpose of the invention, as embodied and broadly described herein, in its broadest aspects, the present invention relates to providing an interactive tool for storing, retrieving, and displaying agent identifying information and agent commission information. The method of the present invention comprises the steps of: receiving agent identifying information and agent commission information; analyzing and sorting the received agent identifying information and agent commission information; saving the agent identifying information and the agent commission information; providing an interactive display of the agent identifying information and the agent commission information; providing interactive access to a display of detailed agent identifying information; and providing interactive access to a display of detailed agent commission information.

In another aspect, the invention comprises a computer readable medium including a software application for enabling interactive access to agent identifying information and agent commission information. The software application comprises: one or more instructions for receiving agent identifying information and agent commission information; one or more instructions for analyzing and sorting the received agent identifying information and agent commission information; one or more instructions for saving the agent identifying information and the agent commission information; one or more instructions for providing an interactive display of the agent identifying information and the agent commission information; one or more instructions for providing interactive access to a display of detailed agent identifying information; and one or more instructions for providing interactive access to a display of detailed agent commission information.

In yet another aspect, the present invention comprises a server system for providing access to agent identifying information and agent commission information, wherein the system comprises: a receiving element for receiving agent identifying information and agent commission information; a processing element for analyzing and sorting the received agent identifying information and agent commission information; a saving element for saving the agent identifying information and the agent commission information; a displaying element for providing an interactive display of the agent identifying information and the agent commission information; a first interface element for providing interactive access to a display of detailed agent identifying information; and a second interface element for providing interactive access to a display of detailed agent commission information.

The accompanying drawings, which are incorporated in and constitute a part of this specification, together with the description, serve to further explain the principles of the invention.

BRIEF DESCRIPTION OF THE DRAWINGS

The present invention can be understood more completely by reading the following Detailed Description of exemplary embodiments, in conjunction with the accompanying drawings, in which.

DETAILED DESCRIPTION OF THE INVENTION

Reference will now be made in detail to the present preferred embodiment of the invention, an example of which is illustrated in the accompanying drawings in which like reference characters refer to corresponding elements.

The system, method, and software application of the present invention described below, are preferably implemented by an interactive computer software application incorporated within a computer-readable medium such as a hard disk drive, an optical medium such as a compact disk, or the like. Further, the computer-readable medium may be available to a user either locally on the user's computer or remotely over a computer network, such as a local area network (LAN) or through the Internet. The inventive computer software application is designed to receive agent identifying information and agent commission information. The software application then analyzes the agent identifying information and agent commission information and stores it in a convenient, easily accessible and useful manner. Once stored, access to the agent identifying information and agent commission information is preferably provided through an interactive display such through an Internet or an intranet web page.

Figure 1:
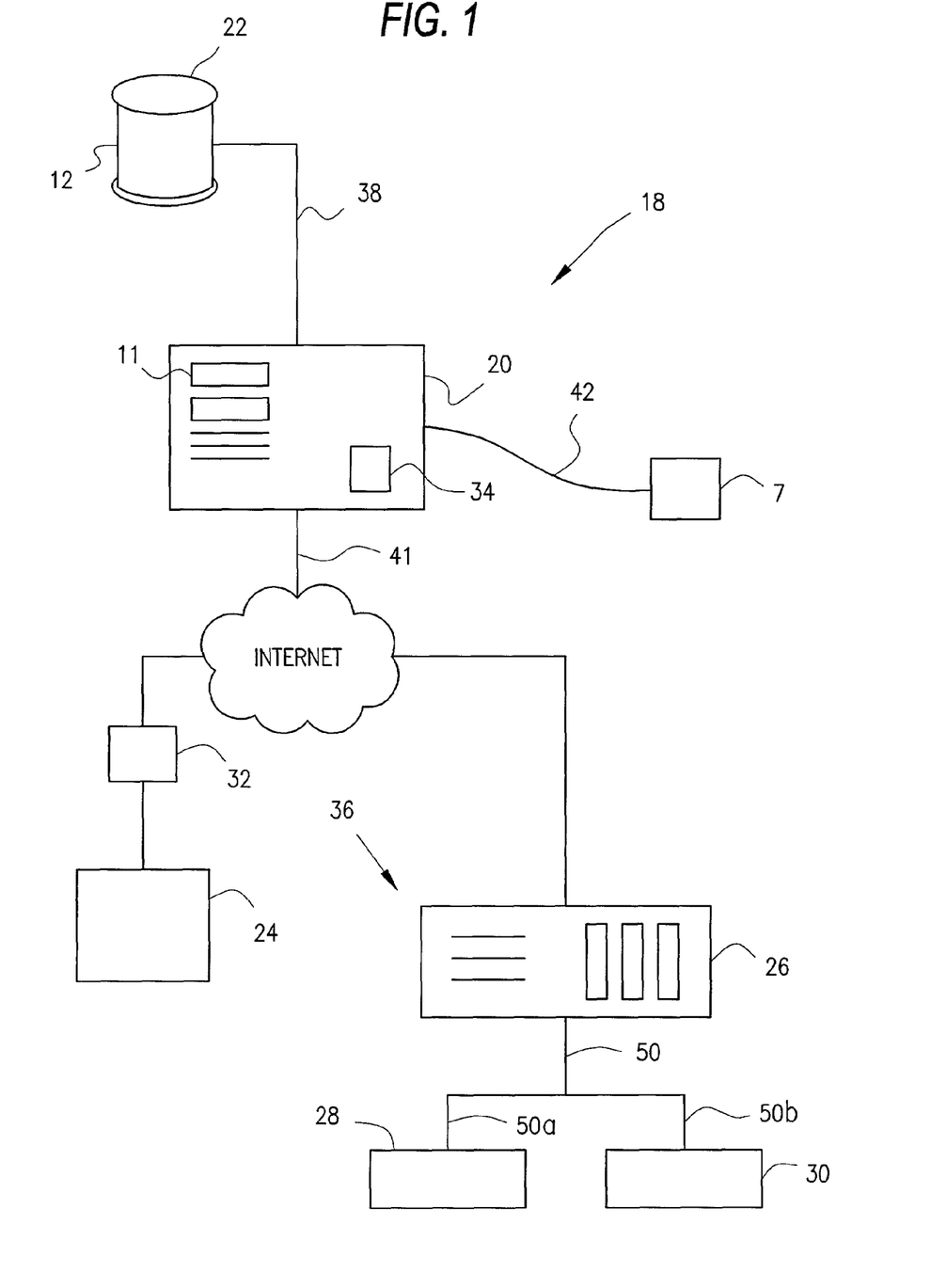
FIG. 1 is a simplified schematic representation illustrating one example of a computer network configuration for use with one embodiment of the present invention.

FIG. 1 illustrates an example network arrangement 18 employing the method and system of the present invention in accordance with a preferred embodiment. It should be understood that the present invention operates independent of any particular arrangement or mix of network components and that the network arrangement 18 depicted in FIG. 1 is purely illustrative and simplified for the purpose of explanation.

As shown in FIG. 1, the example network arrangement 18 comprises an application server 20, a database server 22, a network terminal 7, and a plurality of remote terminals 24, 28, and 30. The application server 20 may be any network, Internet, or enterprise server capable of hosting or supporting Internet and/or network access. According to a preferred embodiment, the application server 20 is run using software such as a Netscape Enterprise Server 3.6.2™ application and a Sun Solaris 2.6™ application. Alternatively, any network operating system and server software may be used. For instance, the present invention may use programs and operating system applications such as, for example, a Windows 95™ operating system application, a Windows 98™ operating system application, a Windows 2000™ operating system application, a Windows NT™ operating system application, a MacIntosh™ operating system application, a Unix™ operating system application, an OS/2™ operating system application, and a NetWare™ operating system application.

As shown, the application server 20 includes a processor module 34 and a memory module 11. The database server 22 includes a database program 12. According to a preferred embodiment, the database server 22 and the database program 12 are preferably run using Oracle™ compatible programs. Within the scope of the present invention, however, the database server 22 may comprise any software that allows for the management of data structured as fields or records, and that is managed by a database management system (DBMS) such as relational databases produced by, for example, Java™, Sybase™, Microsoft™ and Informix™.

The application server 20 may gain access to the database server 22 via a link 38 and access to a network terminal 7 via a network link 42. Additionally, the application server 20, using an Internet connection 40, may communicate with the remote terminal 24 via a connection device 32 and with the remote terminals 28 and 30 via a network server 26 of a LAN network 36. In accordance with the present invention, the connection device 32 may be any device for connecting remote computers or terminals to other computing devices or networks. For instance, the connection device 32 may be a wireless modem, a cable modem or a DSL modem or other means. The network server 26 connects and communicates with the remote terminals 28 and 30 via a link 50 and a link 50a and a link 50b, respectively.

Within the example network arrangement 18, it is preferable that links to databases are made using an interface such as a Java DataBase Connectivity (JDBC) interface. Alternatively, links to databases, as well as links to other network components, may be comprised of a variety of interfaces and protocols such as, for example: an Open DataBase Connectivity (ODBC) interface; a Network File System (NFS) interface; Web NFS interface; a Server Message Block (SMB) interface; a Samba interface; a Netware Core Protocol (NCP) interface; a Distributed File System (DFS) interface, or Common Internet File System (CIFS) architecture, as well as use such transport protocols as, for example, a TCP/IP protocol, an IPX/SPX protocol, an HTTP protocol, and a NetBEUI protocol.

Figure 2:
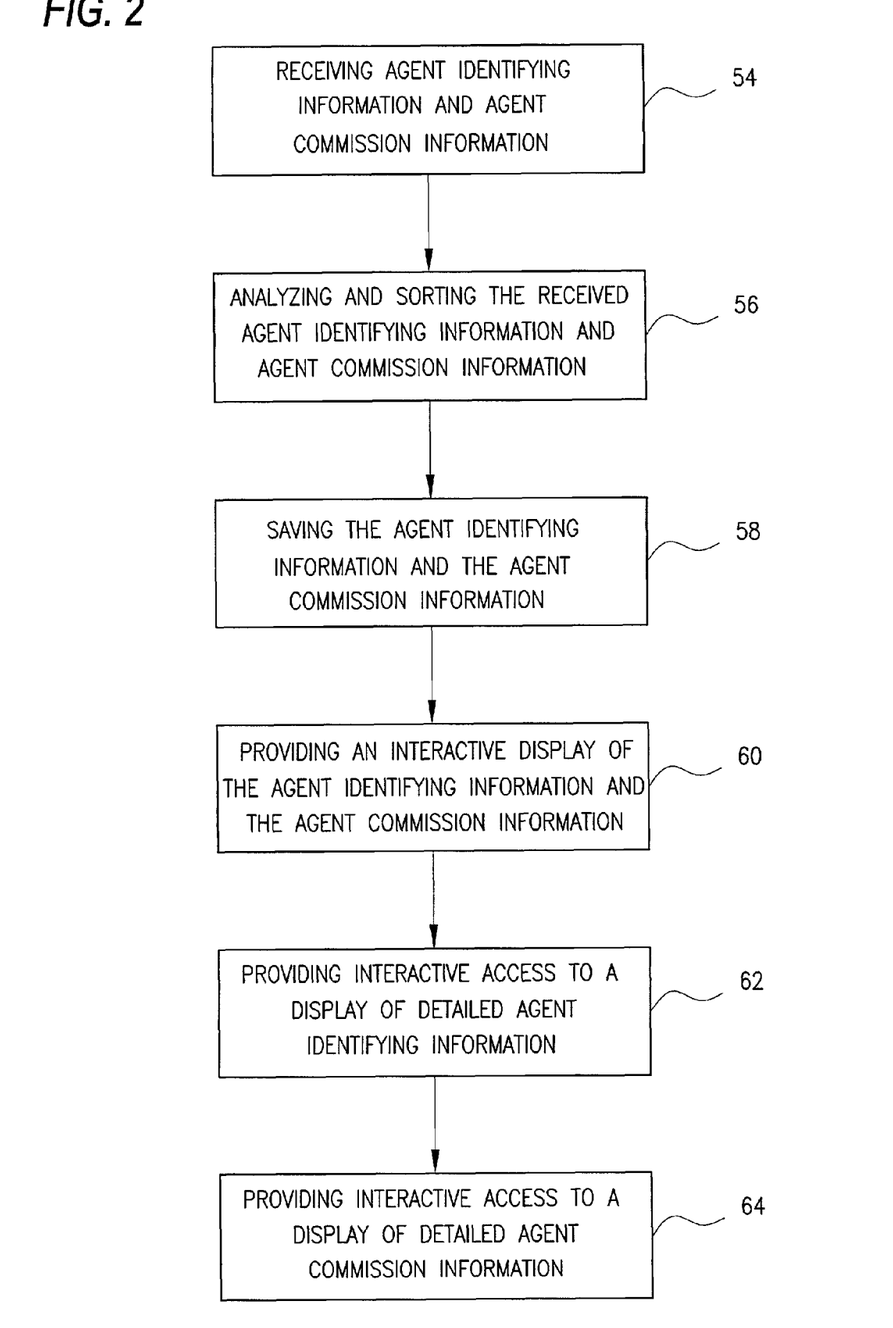
FIG. 2 is a flowchart illustrating the steps in a preferred method for providing access to agent identifying information and agent commission information.

Referring to FIG. 2, there is shown a flow chart illustrating the steps conducted in a method for storing and accessing agent identifying information and agent commission information in accordance with one embodiment of the present invention. In step 54, the agent identifying information and the agent commission information is received for analysis and storage. The agent identifying information and the agent commission information may be submitted via paper or electronic correspondence or may be submitted using other means such as telephonically. In accordance with a preferred embodiment, and with reference to FIG. 1, the agent identifying information and the agent commission information may initially be entered into network terminal 7 and then transmitted via network link 42 to application server 20. In step 56, the received agent identifying information and the agent commission information is analyzed and sorted within the application server 20. Preferably, the analysis and storage of the agent identifying information and the agent commission information may be accomplished through the use of a database program.

After being analyzed and sorted, the agent identifying information and the agent commission information, in step 58, are then saved within a selected database. In accordance with a preferred embodiment, and with reference to FIG. 1, the agent identifying information and the agent commission information are then preferably transmitted via a link 38 to the database server 22 where the information is stored. In step 60, the agent identifying information and the agent commission information are displayed. In accordance with a preferred embodiment of the present invention, the display of the agent identifying information and the agent commission information is preferably provided via web pages which are stored or "hosted" on the application sever 20.

In step 62, interactive access to a display of detailed agent commission information is provided. In accordance with a preferred embodiment of the present invention, the interactive access to the display of the detailed agent commission information is preferably provided via an embedded HTML (Hyper Text Markup Language) link within the "hosted" or stored web pages displaying the agent identifying information and the agent commission information. In step 64, interactive access is further provided to a display of detailed agent identifying information. In accordance with a preferred embodiment of the present invention, the interactive access to the display of detailed agent identifying information is also preferably provided via an embedded HTML (Hyper Text Markup Language) link within the "hosted" or stored web pages displaying the agent identifying information and the agent commission information.

With reference to FIG. 1, the agent identifying information and the agent commission information are preferably accessible by the remote terminals 24, 28 and 30. In a preferred embodiment, the web page functionality of the present invention is preferably provided using HTML links with Java Servlets to generate reports and presentations for users. Alternatively, any suitable programming or presentation language is within the scope of the present invention. For instance, the present invention may be written in other languages or formats such as Java, JavaScript, SGML, XML, or URML.

Figure 3:
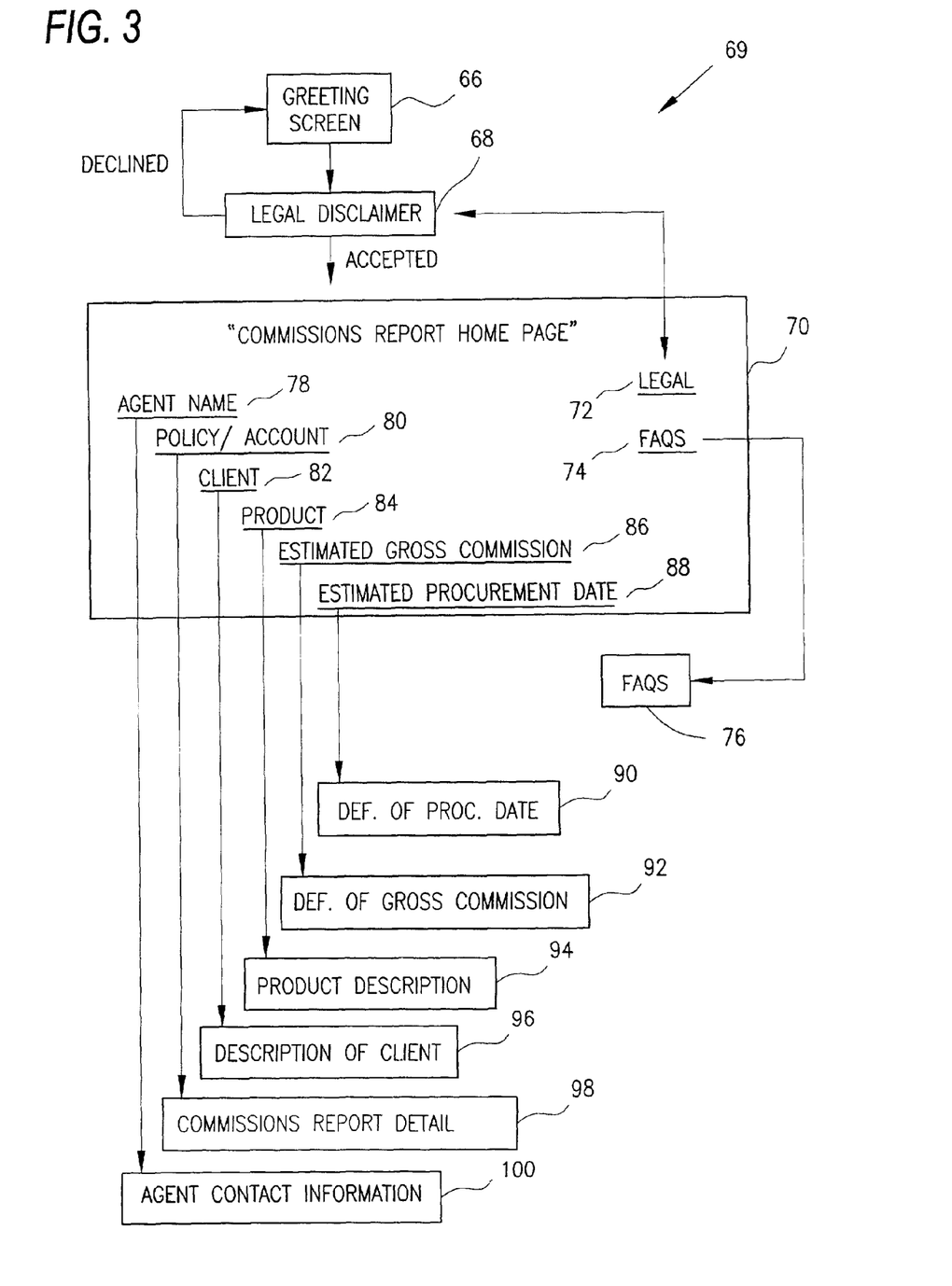
FIG. 3 is a preferred embodiment of one example of a proposed interactive display for providing interactive access to agent identifying information and agent commission information.

Referring now to FIG. 3, in accordance with a preferred embodiment of the present invention, an interactive display 69 in accordance with step 60 is shown. As shown, users accessing the agent identifying information and the agent commission information may first be greeted by a greeting screen 66. The greeting screen 66 may incorporate a company logo, announcements, and other such information. Through the greeting screen 66, users may access the commissions report home page 70. As illustrated, it is preferable that users are provided access to the commission report home page 70 only after accepting the terms and condition of a legal disclaimer 68 or the like.

Once at commissions report home page 70, users may access all available agent identifying information and agent commission information by activating embedded links. Accordingly, users may activate the agent name link 78 to navigate to the agent contact information page 100. Similarly, users wishing to access more detailed information on a particular policy or account may activate policy link 80 to navigate to the commission report detail page 98. Likewise, users may activate the client link 82 to navigate to the client description page 96 or the product link 84 to navigate to the product description page 94.

In accordance with a preferred embodiment of the present invention, additional functionality may be built into the commissions report home page 70. For instance, as illustrated in FIG. 3, an estimated gross commission link 86 may be provided to navigate users to an explanatory page 92 which may provide a definition of gross commission data. Similarly, an estimated processing date link 88 may be provided to navigate users to an explanatory page 90 which may, for example, contain a current definition of the estimated processing date. Additionally, a legal link 72 may be provided to navigate users to a copy of the legal disclaimers 68. Further, a link 74 may be provided to navigate users to pages or files containing information to frequently asked questions (FAQs) 76 or the like.

Figure 4:
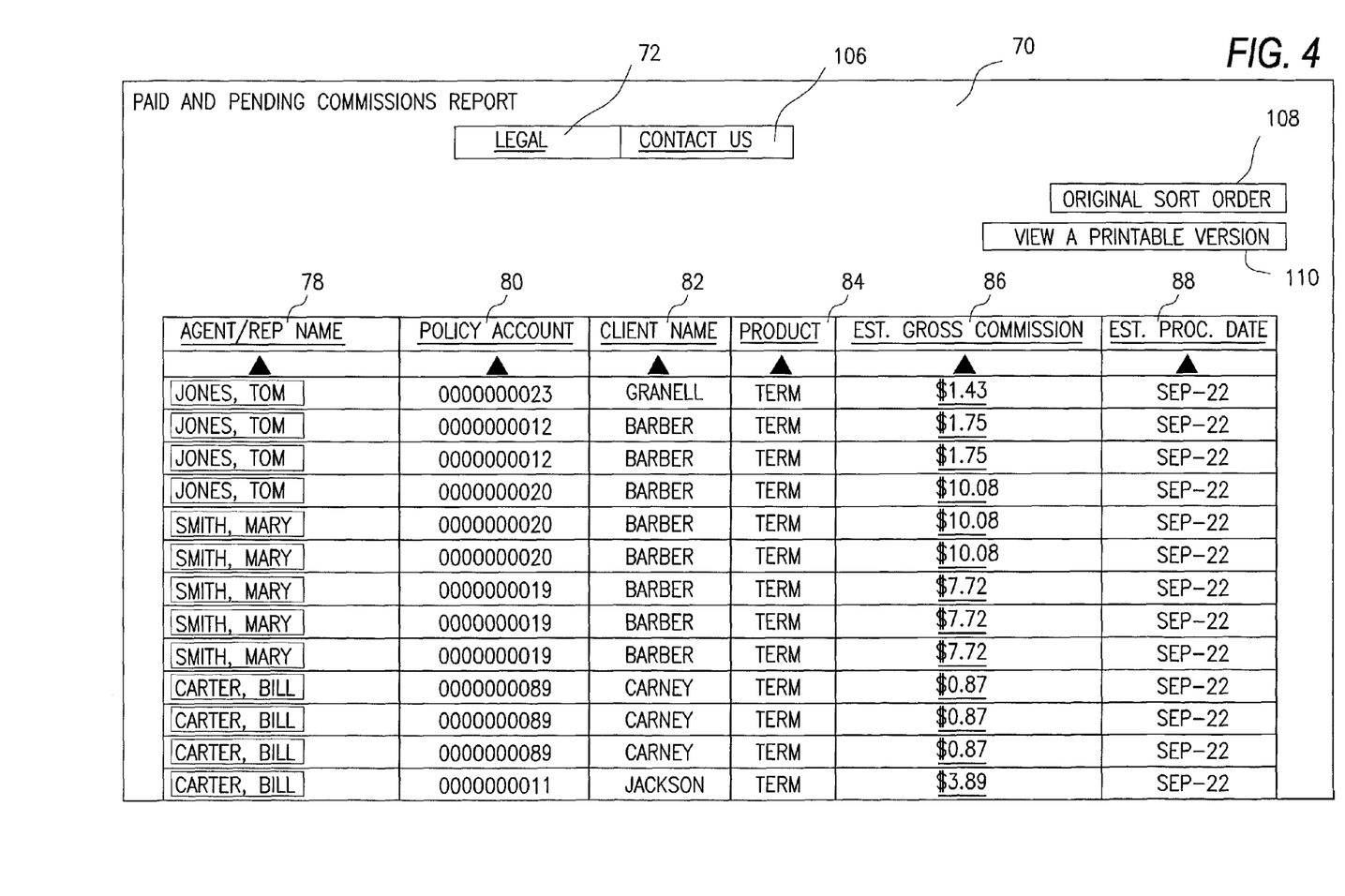
FIG. 4 is a preferred embodiment of a proposed agent data screen for providing interactive access to agent identifying information and agent commission information.
Figure 5:
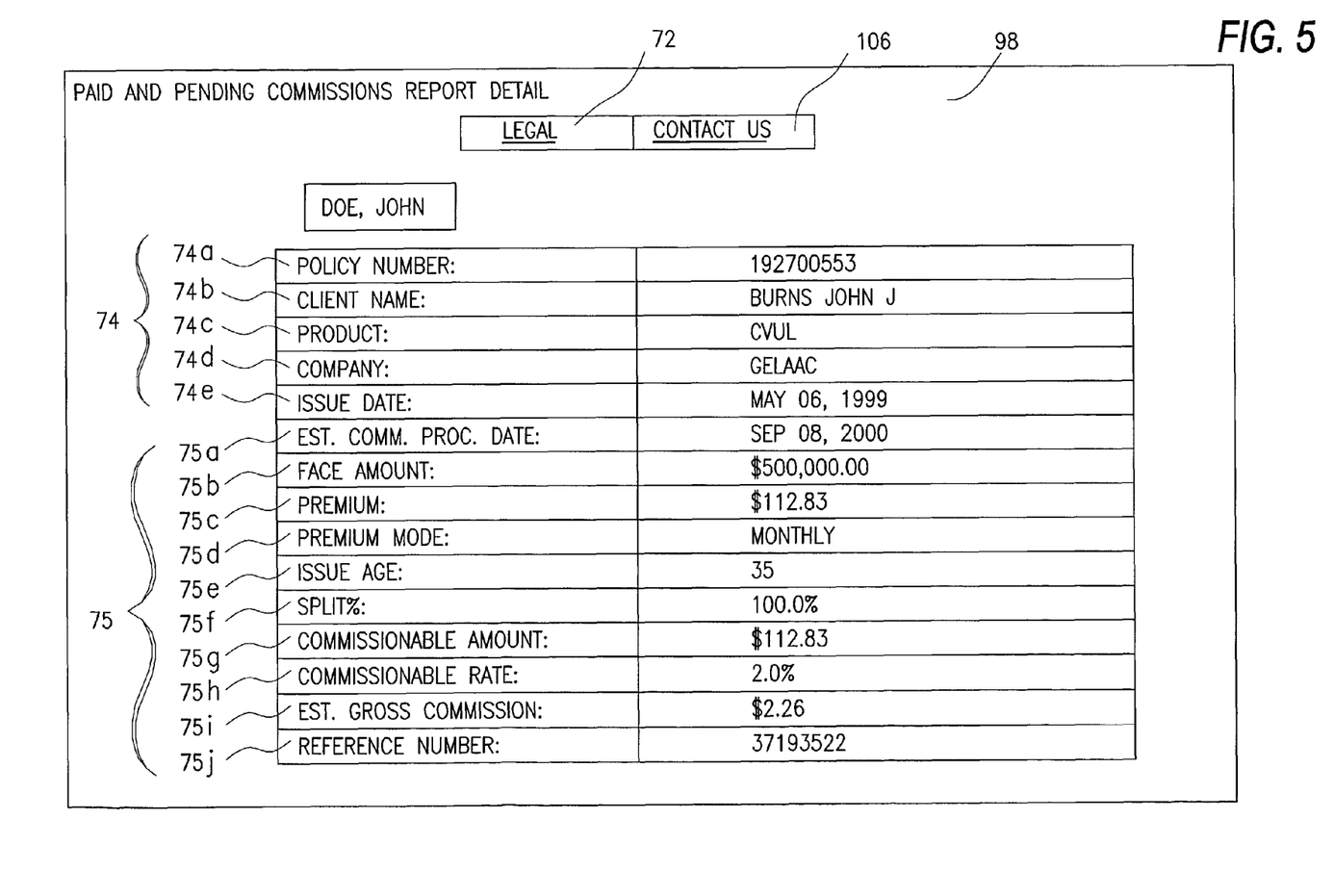
FIG. 5 is a preferred embodiment of an agent commission detail data screen for providing interactive access to agent commission information.

Referring now to FIGS. 4-5, an example commission report page 70 and an example commission report detail page 98 are shown. With respect to each example page, selected exemplary links and features are provided to assist the user in locating and analyzing information. On each page, a legal link 72 may be provided to navigate users to a copy of the legal disclaimer 68. Additionally, a contact button 106 may be provided to generate an e-mail message or the like for an administrator. In accordance with a preferred embodiment, each page may contain additional links and Graphical User Interface (GUI) icons and buttons to allow for specialized functionality within each page as desired. Further, for each selected field or link, "pop-up" boxes and "pull-down" menus may be provided to assist users in entering and identifying information correctly.

Referring now to FIG. 4, an example commissions report home page 70 is shown. As shown, exemplary links 78, 80, 82, 84, 86 and 88 may be provided as column headings to organize and present information. Accordingly, as discussed above with reference to FIG. 3, a user viewing the commissions report home page 70 may activate the agent name link 78 to navigate to an agent contact information page 100. Similarly, users wishing to access more detailed information on the definition or description of a particular column of information, may activate the appropriate link 80, 82, 84, 86, 88 to navigate to the appropriate definition or description 90, 92, 94, 96, or 98. Accordingly, users may activate policy/account link 80 to navigate to the commission report detail page 98. Likewise, users may activate the client link 82 to navigate to the client description page 96 or the product link 84 to navigate to the product description page 94. Similarly, users may activate estimated gross commission link 86 or estimated processing date link 88 to navigate to explanatory pages 92 and 90 respectively. Additionally, as shown, a sort button 108 is provided to allow users to arrange the order of the information provided. Further, a print button 110 is provided to allow users to print selected information.

According to a preferred embodiment of the present invention, specific links may be added, modified or removed altogether to allow for various implementations of the present invention. For instance, according to a specific preferred embodiment, agent name link 78 and agent contact information page 100 may be removed entirely.

Referring now to FIG. 5, an example commission report detail page 98 is shown. As discussed above, users may gain access to commission report detail page 98 via the policy/account link 80. As shown, the commission report detail page 98 provides agent commission information including policy information 74 and commission detail information 75. As shown, the policy information 74 includes: a policy number field 74a; a client name field 74b; a product field 74c; a company field 74d; and an issue date field 74e. As further shown, the commission detail information 75 includes: an estimated commission processing date field 75a; a face amount of policy field 75b; a premium field 75c; a premium mode field 75d; an issue age field 75e; a split percentage field 75f; a commissionable amount field 75g; a commissionable rate field 75h; an estimated gross commission field 75i and a reference number field 75j.

As is readily apparent from the above detailed description, the system and method of the present invention may be used in a variety of network configurations. The system and method of the invention are also highly flexible and can be easily modified and customized to fit specific situations. For instance, for each of the example web pages discussed, many different fields may be created and used to display pertinent agent information as desired. Further, individual data fields provided as illustrated in FIGS. 4-5 may be deleted and removed altogether. Additionally, present invention may be used within network arrangements such as a local area network (LAN) including an Ethernet and a Token Ring access method, a metropolitan area network (MAN), and a wide area network (WAN). Further, although the preferred embodiments are discussed with reference to the Windows NTTM environment, the present invention may also be used in a variety of other server platforms and operating environments such as, for example, Windows 95, 98 and 2000, Unix, OS/2 and NetWare.

Additionally, the present invention may be used with a variety of networking links including those based upon, for example, a Network File System (NFS); a Web NFS; a Server Message Block (SMB); a Samba; a Netware Core Protocol (NCP); a Distributed File System (DFS), and a Common Internet File System (CIFS) architecture, as well as use such transport protocols as, for example, TCP/IP, IPX/SPX, HTTP and NetBEUI.

The invention has been described with particular reference to preferred embodiments which are intended to be illustrative rather than restrictive. Alternative embodiments will become apparent to those skilled in the art to which this invention pertains without departing from its spirit and scope. Thus, such variations and modifications of the present invention can be effected within the spirit and scope of the following claims.

What is claimed is:

1. A method for enabling interactive access to and verification of agent commission information using a data processor, said method comprising the steps of:

receiving, by the data processor, agent identifying information and agent commission information, wherein said agent identifying information comprises at least one selected from the group consisting era name, an address, and a telephone number;

analyzing and sorting, by the data processor, the received agent identifying information and agent commission information;

saving, by the data processor, the agent identifying information and the agent commission information;

providing an interactive display, by the data processor, of the agent identifying information and the agent commission information;

providing interactive access, by the data processor, to a display of detailed agent identifying information; and providing interactive access, by the data processor, to a display of detailed agent commission information;

wherein the detailed agent identifying information or the detailed agent commission information is sorted and searchable by the following hyperlinks: agent name, policy/account, client, product, estimated gross commission and estimated procurement date;

and activating a policy/account link, by the data processor, wherein the activation of the policy/account link generates a paid and pending commission report comprising particulars on policy number, client name, product, company, issue date, estimated commission procurement date, face amount, premium, premium mode, issue age, split %, commissionable amount, estimated gross commission and reference number.

2. The method of claim 1, wherein said agent identifying information further comprises: a writing code.

3. The method of claim 2, wherein said detailed agent commission information comprises: policy information; and commission detail information.

4. The method of claim 3, wherein said policy information comprises:

a policy number;
a client name;
a product name;
a company name; and
art issue date.

5. The method of claim 4, wherein said commission detail information comprises:

an estimated commission processing date for a commission;

a face amount of a policy;
a premium for a policy;
a mode for the premium of a policy; and
an issue age of a policy.

6. A non-transitory computer readable medium including a software application for enabling interactive access to and verification of agent commission information, said software application comprising:
one or more instructions for receiving agent identifying information and agent commission information, wherein said agent identifying information comprises at least one selected from the group consisting of a name, an address, and a telephone number;
one or more instructions for analyzing and sorting the received agent identifying information and agent commission information;
one or more instructions for saving the agent identifying information and the agent commission information;
one or more instructions for providing an interactive display of the agent identifying information and the agent commission information,
one or more instructions for providing interactive access to a display of detailed agent identifying information; and
one or more instructions for providing interactive access to a display of detailed agent commission information;
wherein the detailed agent identifying information or the detailed agent commission information is sorted and searchable by the following hyperlinks: agent name, policy/account, client, product, estimated gross commission and estimated procurement date; and
one or more instructions for activating a policy/account view by selecting a policy/account hyperlink, wherein the activation of the policy/account view generates a paid and pending commission report comprising particulars on policy number, client name, product, company, issue date, estimated commission procurement date, face amount, premium, premium mode, issue age, split %, commissionable amount, estimated gross commission and reference number.

7. The computer readable medium of claim 6, wherein said agent identifying information further comprises: a writing code.

8. The software application of claim 7, wherein said detailed agent commission information comprises: policy information; and commission detail information.

9. The software application of claim 8 wherein said policy information comprises:
a policy number;
a client name;
a product name;
a company name; and
an issue date.

10. The software application of claim 8, wherein said commission detail information comprises: an estimated commission processing date for a commission; a face amount era policy; a premium for a policy; a mode for the premium of a policy; and an issue age era policy.

11. A server system for enabling interactive access to and verification of agent commission information, said system comprising:
a receiving element that receives agent identifying information and agent commission information, wherein said agent identifying information comprises at least one selected from the group consisting era name, an address, and a telephone number;
a processing element that analyzes and sorts the received agent identifying information and agent commission information;
a saving element for saving the agent identifying information and the agent commission information;
a displaying element that provides an interactive display of the agent identifying information and the agent commission information;
a first interface element that provides interactive access to a display of detailed agent identifying information; and
a second interface element that provides interactive access to a display of detailed agent commission information;
wherein the detailed agent identifying information or the detailed agent commission information is sorted and searchable by the following hyperlinks: agent name, policy/account, client, product, estimated gross commission and estimated procurement date; and
activating a policy/account link, wherein the activation of the policy/account link generates a paid and pending commission report comprising particulars on policy number, client name, product, company, issue date, estimated commission procurement date, face amount, premium, premium mode, issue age, split %, commissionable amount, estimated gross commission and reference number.

12. The system of claim 11, wherein said agent identifying information further comprises: a writing code.

13. The system of claim 11, wherein said detailed agent commission information comprises: policy information; and commission detail information.

14. The system of claim 13 wherein said policy information comprises: a policy number; a client name; a product name; a company name; and an issue date.

15. The system of claim 13, wherein said commission detail information comprises:
an estimated commission processing date for a commission; a face amount of a policy; a premium for a policy; a mode for the premium of a policy; and an issue age of a policy.

16. The method of claim 1 wherein said agent identifying information includes a name, an address, and a telephone number.

17. The computer readable medium of claim 6 wherein said agent identifying information includes a name, an address, and a telephone number.

18. The method of claim 1, wherein the detailed commission information comprises a gross commission.

19. The computer readable medium including a software application of claim 6, wherein the detailed commission information comprises a gross commission.

20. The system of claim 11, wherein the detailed commission information comprises a gross commission.

21. A method for enabling interactive access to and verification of agent commission information using a data processor, said method comprising the steps of:
receiving; by the data processor, agent identifying information and agent commission information, wherein said agent identifying information comprises at least one selected from the group consisting of a name, an address, and a telephone number;

analyzing and sorting, by the data processor, the received agent identifying information and agent commission information;

saving, by the data processor, the agent identifying information and the agent commission information;

providing an interactive display, by the data processor, of the agent identifying information and the agent commission information;

providing interactive access, by the data processor, to a display of detailed agent identifying information; and providing interactive access, by the data processor, to a display of detailed agent commission information;

wherein the detailed agent identifying information or the detailed agent commission information is sorted and searchable by the following hyperlinks: agent name, policy/account, client, product, estimated gross commission and estimated procurement date;

and activating a policy/account link, by the data processor, wherein the activation of the policy/account link generates a paid and pending commission report comprising particulars on policy number, client name, product, company, issue date, estimated commission procurement date, face amount, premium, premium mode, issue age, split %, commissionable amount, estimated gross commission and reference number.

* * * * *